United States Patent
Brown

(10) Patent No.: US 9,470,521 B1
(45) Date of Patent: Oct. 18, 2016

(54) PASSIVE RANGE-DISCRIMINATION IN THERMAL AND OTHER IMAGING SYSTEMS

(71) Applicant: Robert G. Brown, Tustin, CA (US)

(72) Inventor: Robert G. Brown, Tustin, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 26 days.

(21) Appl. No.: 13/901,274

(22) Filed: May 23, 2013

(51) Int. Cl.
*G01C 3/08* (2006.01)

(52) U.S. Cl.
CPC ....................................... *G01C 3/08* (2013.01)

(58) Field of Classification Search
CPC ....... G01C 3/08; G01C 15/002; G01S 17/89; G01S 7/4817; G01S 17/42
USPC ....... 356/3.01, 4.01, 4.07, 5.01, 5.09, 9, 625
See application file for complete search history.

(56) References Cited

U.S. PATENT DOCUMENTS

| | | | | |
|---|---|---|---|---|
| 4,997,274 A | * | 3/1991 | Takakusagi et al. | 356/72 |
| 5,057,681 A | * | 10/1991 | Beder et al. | 250/208.2 |
| 5,175,596 A | * | 12/1992 | Dick et al. | 356/442 |
| 5,949,071 A | | 9/1999 | Ruffner et al. | |
| 6,255,657 B1 | * | 7/2001 | Cole et al. | 250/367 |
| 8,089,115 B2 | | 1/2012 | Leong et al. | |
| 8,492,727 B1 | | 7/2013 | Brown et al. | |
| 2002/0141062 A1 | * | 10/2002 | Christoffersen et al. | 359/566 |
| 2003/0162503 A1 | * | 8/2003 | LeCren | 455/67.1 |
| 2007/0171534 A1 | * | 7/2007 | Chien | 359/642 |
| 2007/0280282 A1 | * | 12/2007 | Tzeng et al. | 370/464 |
| 2008/0251704 A1 | * | 10/2008 | Carras et al. | 250/237 G |
| 2008/0297800 A1 | * | 12/2008 | Yamada et al. | 356/442 |
| 2009/0273779 A1 | * | 11/2009 | Baumberg et al. | 356/301 |
| 2010/0058978 A1 | | 3/2010 | Nikoobakht | |
| 2010/0124053 A1 | | 5/2010 | Wu et al. | |
| 2010/0127172 A1 | | 5/2010 | Nikoobakht | |
| 2011/0280365 A1 | * | 11/2011 | Kojima et al. | 378/5 |
| 2012/0050732 A1 | * | 3/2012 | Lu et al. | 356/301 |
| 2012/0320213 A1 | * | 12/2012 | Ikeda et al. | 348/148 |
| 2013/0075699 A1 | | 3/2013 | Brown et al. | |

FOREIGN PATENT DOCUMENTS

| | | |
|---|---|---|
| RU | 2374720 C1 | 11/2009 |
| RU | 101866 U1 | 1/2011 |

(Continued)

OTHER PUBLICATIONS

Anderson, Surface Enhanced Infrared Absorption by Coupling Photon and Plasmon Resonance, Applied Physics Letters, 2005, 4 pages.

(Continued)

*Primary Examiner* — Luke Ratcliffe
*Assistant Examiner* — Samantha K Abraham
(74) *Attorney, Agent, or Firm* — Donna P. Suchy; Daniel M. Barbieri

(57) ABSTRACT

A detector system is described. The detector system includes imaging optics having a focal plane, and an electromagnetic radiation (EMR) detector. The EMR detector is arranged to receive EMR from the imaging optics, and has a detector axis perpendicular to the focal plane. The EMR detector has a plurality of detector regions arranged progressively along the detector axis. The detector regions are arranged to respectively detect EMR imaged from progressively different object distances from the imaging optics.

23 Claims, 6 Drawing Sheets

(56) References Cited

FOREIGN PATENT DOCUMENTS

| WO | WO-2008/135905 | 11/2008 |
|----|----------------|---------|
| WO | WO-2009/104188 | 8/2009  |

OTHER PUBLICATIONS

Campbell, Optoelectronic Technology and Lightwave Communication Systems, Van Nostrand Reinhold, 1989, 40 pages.

International Search Report and Written Opinion for Application No. PCT/US12/35112. mail date Jun. 28, 2012, 5 pages.

Knight et al., Photodetection with Active Optical Antennas, May 6, 2011, 5 pages.

McIntyre, Recent Developments in Silicon Avalanche Photodiodes, 1985, 7 pages.

McIntyre, The Distribution of Gains in Uniformly Multiplying Avalanche Photodiodes: Theory, IEEE Transactions on Electron Devices, Jun. 1972, 11 pages.

Miyachi et al., A Photosensing System Composed of Photosystem I, Molecular Wire, Gold Nano-Particle, and Double Surfactants in Water, 2010, 3 pages.

Radford et al., Sensitivity Improvements in Uncooled Microbolometer FPAs, Proc. SPIE, 1999, 12 pages.

Rogalski, Selected Papers on Infrared Detectors: Developments, 2004.

Saleh et al., Fundamentals of Photonics, 1991, 4 pages.

Sonnichsen et al., Drastic Reduction of Plasmon Damping in Gold Nanorods, Phys. Rev. Letts., 2002, 4 pages.

Wokaun, Surface Enhancements of Optical Fields, Molecular Physics, 1985, 34 pages.

Yamaguchi et al., Optical Effect of the Substrate on the Anomalous Absorption of Aggregated Silver Films, Thin Solid Films, 1974, 15 pages.

Zayats et al., Nano-Optics of Surface Plasmon Polaritons, Physics Reports 408, 2005, 184 pages.

Zhao et al., The Extinction Spectra of Silver Nanoparticle Arrays: Influence of Array Structure on Plasmon Resonance Wavelength and Width, J. Phys. Chem. B, 2003, 8 pages.

\* cited by examiner

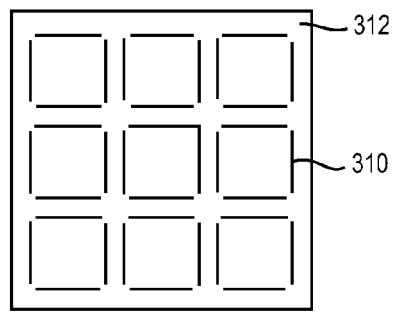
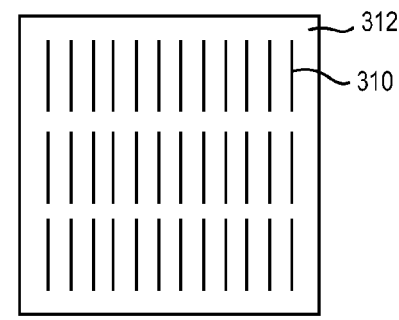
FIG. 3A
FIG. 3B
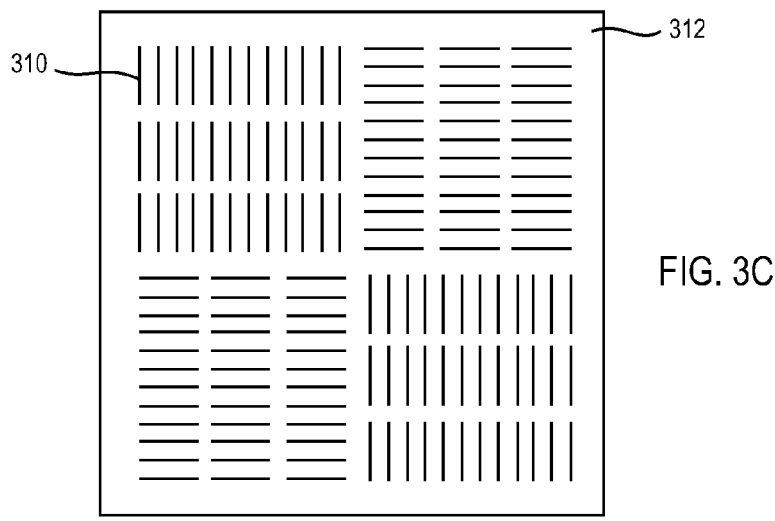
FIG. 3C
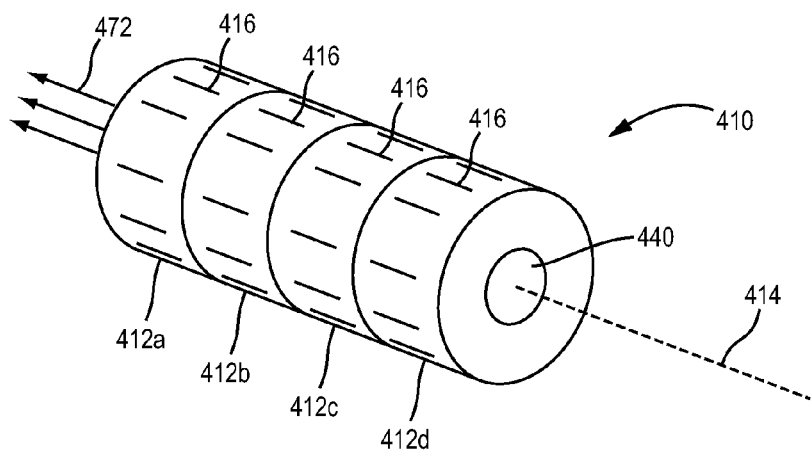
FIG. 4

PASSIVE RANGE-DISCRIMINATION IN THERMAL AND OTHER IMAGING SYSTEMS

BACKGROUND OF THE INVENTION

Standard thermal imaging systems of nearly all makes, types and varieties typically employ arrays of planar pixels arranged in a focal plane array (FPA) to detect thermal electromagnetic radiation (EMR) of the image of some distant scene created by imaging optics, in the manner that a typical digital camera does with its CMOS detector array. FIG. 11 illustrates a schematic of such an imaging system 1000 of such a camera with a lens 1020 as the imaging optics, imaging EMR from an object 1050 onto a real image 1060 on a FPA 1010. In FIG. 11, the lens has a focal length f, an object distance $S_1$ and an image distance $S_2$ as shown.

The depth of field of such a camera, i.e., the range of distances in focus at the FPA 1010, can be quite small for close up objects, where $S_1$ would typically be centimeters, to a few meters. As $S_1$ increases from a few meters distance, however, the depth of field increases to a large distance. There is little or no way effectively to reduce that great depth of field except by reducing the f/number (focal length/diameter) of the imaging lens. Typically the f/number will only be increase so far, up to ~f/1, and at considerable cost in a thermal imager system.

Thus, conventional thermal imaging systems which employ a planar FPA and image a distant object may suffer from issues which occur due to a large depth of field, and range discrimination of an object may be problematic.

One object of thermal imaging where an object must be imaged at a large distance is clear air turbulence (CAT). CAT is the turbulent movement of air masses in the absence of any visual cues such as clouds, and is caused when bodies of air moving at widely different speeds meet. The atmospheric region most susceptible to CAT is the high troposphere at altitudes of around 7,000-12,000 meters (23,000-39,000 ft) as it meets the tropopause. Here CAT is most frequently encountered in the regions of jet streams. At lower altitudes it may also occur near mountain ranges. Thin cirrus clouds can also indicate a high probability of CAT.

CAT can be hazardous to the comfort, and even safety, of air travel. The thermal characteristics of CAT are known. Studies show that gust velocity changes in CAT of at least 20 ft $sec^{-1}$ are associated with temperature changes of 3° C. or higher; very few being less than 1° C. Such studies show that CAT horizontal temperature gradients with a minimum temperature change of 2° C., and at a rate which equaled or exceeded 0.5° C. per minute. Moderately choppy CAT was observed at a 5° C. temperature change.

Conventionally, CAT has been measured using active electro-optical heterodyne laser velocimeter systems at ranges exceeding 10 km. Such active systems typically use 10 micron wavelength LWIR (long wavelength infrared) $CO_2$ lasers, larger germanium optics and heterodyning optics. Fast, complex signal and data processing renders systems constructed along these line are expensive, power-hungry, heavy, and physically large. Further such active systems require much maintenance on a use-by-use basis in alignment, cleaning etc.

SUMMARY OF THE INVENTION

According to one embodiment there is provided a detector system comprising: imaging optics having a focal plane; and an electromagnetic radiation (EMR) detector arranged to receive EMR from the imaging optics, having a detector axis perpendicular to the focal plane, and having a plurality of detector regions arranged progressively along the detector axis, the detector regions arranged to respectively detect EMR imaged from progressively different object distances from the imaging optics.

According to one aspect of the embodiment, the EMR detector has a rod shape with the detector axis along an axis of the rod shape.

According to another aspect of the embodiment, the EMR detector has a hole along the axis of the rod shape.

According to another aspect of the embodiment, each detector region is configured to selectively detect EMR incident on the detector region at an angle with respect to the detector axis within an angular range, and to selectively discriminate EMR incident outside the angular range, the angular range corresponding to the object distance of the EMR imaged to the detector region.

According to another aspect of the embodiment, each detector region comprises a nanoparticle plasmonic detector having an array of nanoparticles.

According to another aspect of the embodiment, each detector region comprises a nanoparticle plasmonic detector having an array of nanoparticles.

According to another aspect of the embodiment, the nanoparticles of each detector region have a size, shape and spacing to provide the selective detection of EMR incident on the detector region at an angle with respect to the detector axis within the angular range.

According to another aspect of the embodiment, the nanoparticles of each detector region have a size, shape and spacing to selectively detect EMR at a wavelength within a wavelength band.

According to another aspect of the embodiment, the wavelength band is within the infrared (IR) region.

According to another aspect of the embodiment, each detector region is configured to detect EMR by a photo-detection process.

According to another aspect of the embodiment, each detector region comprises a semiconductor material.

According to another aspect of the embodiment, the nanoparticles of each detector region have a size, shape and spacing to selectively detect EMR having a predetermined polarization state.

According to another aspect of the embodiment, the detector system further comprises: signal processing electronics configured to receive a detection signal from each of the plurality of detector regions, and to determine the range of an object being imaged by the imaging optics based on the received detection signals.

According to another aspect of the embodiment, the detector system further comprises: a plurality of wires electrically connecting the signal processing electronics to the plurality of detector regions.

According to another aspect of the embodiment, the plurality of wires are transparent or opaque.

According to another aspect of the embodiment, the plurality of wires are transparent.

According to another aspect of the embodiment, the signal processing electronics comprises a back-plane signal-processing device.

According to another aspect of the embodiment, the plurality of detector regions are supported by a transparent supporting substrate.

According to another aspect of the embodiment, a system for detecting EMR, comprises: a structure having the detector system mounted thereon, wherein the structure is one of a vehicle or a ground-based platform.

According to another embodiment, there is provided an electromagnetic radiation (EMR) detector having a detector axis, comprising: a plurality of detector regions arranged progressively along the detector axis, the detector regions arranged to respectively detect EMR incident upon respective of the detector regions.

According to an aspect of the embodiment, the EMR detector has a rod shape with the detector axis along an axis of the rod shape.

According to another aspect of the embodiment, the EMR detector has a hole along the axis of the rod shape.

According to another aspect of the embodiment, each detector region is configured to selectively detect EMR incident on the detector region at an angle with respect to the detector axis within an angular range, and to selectively discriminate EMR incident outside the angular range.

According to another aspect of the embodiment, each detector region comprises a nanoparticle plasmonic detector having an array of nanoparticles.

According to another aspect of the embodiment, the nanoparticles of each detector region have a size, shape and spacing to provide the selective detection of EMR incident on the detector region at an angle with respect to the detector axis within the angular range.

BRIEF DESCRIPTION OF THE DRAWINGS

FIGS. 3A, 3B and 3C respectively illustrate arrangements of nanoparticles for a nanoparticle plasmonic array which have different polarization geometries according to embodiments of the invention.

FIG. 4 is a schematic illustrating an axially arranged EMR detector according to an embodiment of the invention.

DETAILED DESCRIPTION OF THE PREFERRED EMBODIMENTS

According to one embodiment of the invention of a detector system, which may be used for thermal imaging of objects at a large distance, an EMR detector is employed which does not have its pixels all arranged in a plane as is the case for a typical FPA. Rather, the detector is arranged as an axial detector, with the pixels subdivided in a plurality of zones arranged progressively along an axis of the axial detector. Such an arrangement allows for range discrimination and some reduction in natural background noise level.

The EMR detector with an axial arrangment may be used for passive detection of CAT. The EMR detector, however, is not limited to CAT detection, but is appropriate to thermal imaging systems in general, and indeed to more general imaging systems, and provides for better image quality, improved target detection, recognition, and identification probabilities.

Figure 1:
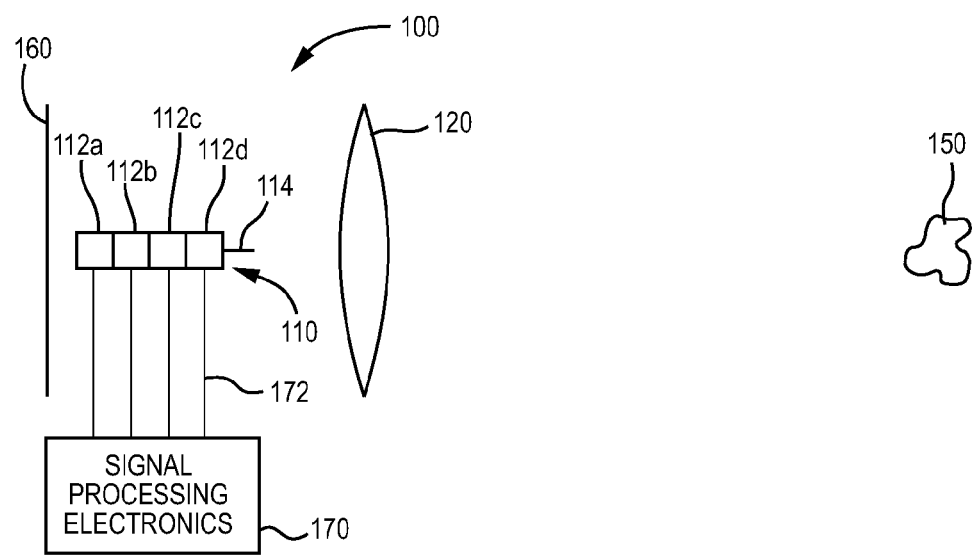
FIG. 1 is a schematic illustrating a detector system according to an embodiment of the invention.

FIG. 1 is a schematic illustrating a detector system 100 according to an embodiment of the invention. The system 100 includes imaging optics 120 and a EMR detector 110. The imaging optics 120 images EMR radiation from an object 150 onto the EMR detector 110, which receives the EMR from the imaging optics 120. The imaging optics 120 has a focal plane 160, where EMR from an object at an infinite distance from the system would be imaged onto the focal plane 160. An axis 114 of EMR detector 110 is perpendicular to the focal plane 160.

The EMR detector 110 has a plurality of detector regions 112 (112a, 112b, 112c and 112d) arranged progressively along the detector axis 114. The detector regions 112 are arranged to respectively detect EMR imaged from progressively different object distances from the imaging optics 120. In particular, the detector region 112a arranged closest to the focal plane 160 is arranged to receive and detect EMR from a furthest object, while the detector region 112d arranged furthest from the focal plane 160 is arranged to receive and detect EMR from a closest object. While the number of detector regions 112 illustrated in FIG. 1 is four, in general the number of detector regions is a plurality and may be more or less than four.

Figure 2:
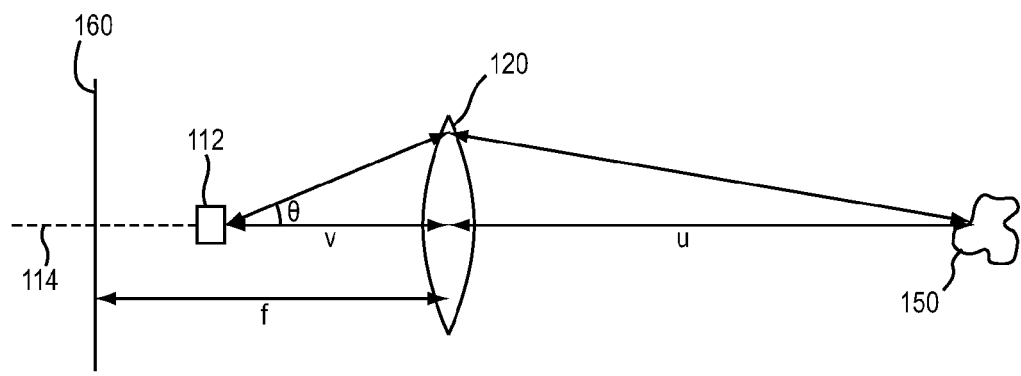
FIG. 2 illustrates a detector region receiving EMR radiation images from imaging optics from an object.

FIG. 2 illustrates a detector region 112 receiving EMR radiation images from imaging optics 120 from an object 150. In FIG. 2, the imaging optics has a focal length f, the object 150 has an object distance u, and is imaged onto the imaging plane at an image distance v from the imaging optics 120. The focal plane 160 is separated from the imaging optics by the focal length distance f. Thus, in FIG. 2, the detector region 112 is arranged at distance from the imaging optics to receive EMR imaged by the imaging optics 120 from the object at the object distance u.

The detector region 112 receives EMR imaged from the imaging optics and directed to the detector region 112 at an angle θ with respect to the detector axis 114, which is also the axis of the imaging optics 120. In general, the detector region 112 receives EMR imaged from the imaging optics and directed to the detector region 112 within a band of angles where the angle θ is the center angle corresponding to the most EMR received.

The detector system 100 may include signal processing electronics 170 arranged to receive a detection signal from each of the plurality of detector regions 112. The signal processing electronics 170 may determine the range of an object being imaged by the imaging optics based on the received detection signals. The detector system 100 may include a plurality of wires 172 electrically connecting the signal processing electronics respectively to the detector regions 112. The wires 172 may be transparent or very thin metal connector wires to conduct photo current to the signal processing electronics 170, which may discriminate the photo current from each of the detector regions. The signal processing electronics 170 may be embodies as a back-plane processor, for example. The wires 172 may be opaque in certain applications.

Preferably the detector region 112 is configured to selectively detect EMR incident on the detector region 112 at the angle θ with respect to the detector axis within the angular range, and to selectively discriminate EMR incident outside the angular range. In this regard each detector region 112 may comprise a nanoparticle plasmonic detector. Nanoparticle plasmonic detector arrays are described in, for example, U.S. patent application Ser. No. 13/243,342 entitled NANO-STRUCTURE ARRAYS FOR EMR IMAGING, filed Sep. 23, 2011, which is incorporated by referenced in its entirely herein. The nanoparticles preferably selectively absorb the desired incoming wavelength range of EMR. The nanoparticle plasmonic detector arrays of the detector region may also be optimized to receive a selected range of angles of incidence centered at the angle θ, and further function to discriminate against natural background EMR noise, such as daylight, moonlight, etc., that may come from a wider range of angles than that occupied by the desired radiation from the object of interest.

Nanoparticle plasmonic detector array structures can be tuned for selective ranges of incidence angles of the incoming radiation to be absorbed, and also for selective detection of polarized or un-polarized light [see J. Munarriz, A. V. Malyshev, V. A. Malyshev and J. Knoester, (2013), '*Optical Nanoantennas with Tunable Radiation Patterns*', Nano Letters, dx.doi.org/10.1021/n1303815a].

FIGS. 3A, 3B and 3C illustrate an arrangement of nanoparticles for a nanoparticle plasmonic array which illustrate different polarization geometries, each arrangement including a plurality of nanoparticles 310 arranged in a matrix 312. The geometry of FIG. 3A offers the possibility of detecting orthogonal 'pure' polarizations within a single pixel by electrically connecting to the rows and columns. FIG. 3B offers the possibility of discriminating a single polarization state in a pixel. FIG. 3C offers the possibility of detecting multiple specific wavelengths, by using rod length variations, and specific polarizations within the same pixel.

The nanoparticle plasmonic detector array structures can be tuned for absorbing specific EMR of specific wavelengths as described in, for example, U.S. patent application Ser. No. 13/243,342 entitled NANO-STRUCTURE ARRAYS FOR EMR IMAGING, filed Sep. 23, 2011, which is incorporated by referenced in its entirely herein. The nanoparticle plasmonic detector array structures may be tuned by selecting an appropriate size and shape of the nanoparticles, nanoparticle spacing, nanoparticle material, and the matrix material in which the nanoparticles are embedded. Further ranges of incidence angles of the incoming radiation to be absorbed may also be selected by selecting an appropriate size and shape of the nanoparticles as well as nanoparticle spacing.

The detector regions 112 need not comprise a nanoparticle plasmonic detector, however. Instead, the detector regions 112 may be made of standard semiconductor materials such as Mercury Cadmium Telluride (MCT) or InGaAs or other compound-semiconductor used for infra-red, visible wavelengths, and ultra-violet region detection. Range resolution and background noise level suppression may still be achieved if the materials for the detector regions 112 absorb efficiently at fairly large angles of incidence, which may be achieved by including roughness or diffraction structures on the surfaces of the detector regions 112.

Returning to FIG. 1, for detection of thermal EMR using nanoparticle plasmonic detectors, for the case of an EMR detector 110 in the shape of a rod, the diameter of each rod might be tens to hundreds of microns. The axial dimensions of each detector region 112 may be tens of microns to hundreds of microns typically.

FIG. 4 illustrates an axially arranged EMR detector 410 according to an embodiment of the invention, where the EMR detector could be used as the EMR detector 110 of the system 100 of FIG. 1. The EMR detector 410 is subdivided along its axis 414 into detector regions 412 that correspond to object range intervals.

The EMR detector 410 may be hollow having a hole 440 running along the axis 414. The hole may contain wires 472 electrically connecting respectively each detector region 412 to processing electronics (not shown in FIG. 4, but see signal processing electronics 170 in FIG. 1). In the case that the detector regions 412 comprise a nanoparticle plasmonic detector array, each of the detector regions 412 has a plurality of nanoparticles 416 arranged therein.

Figure 5:
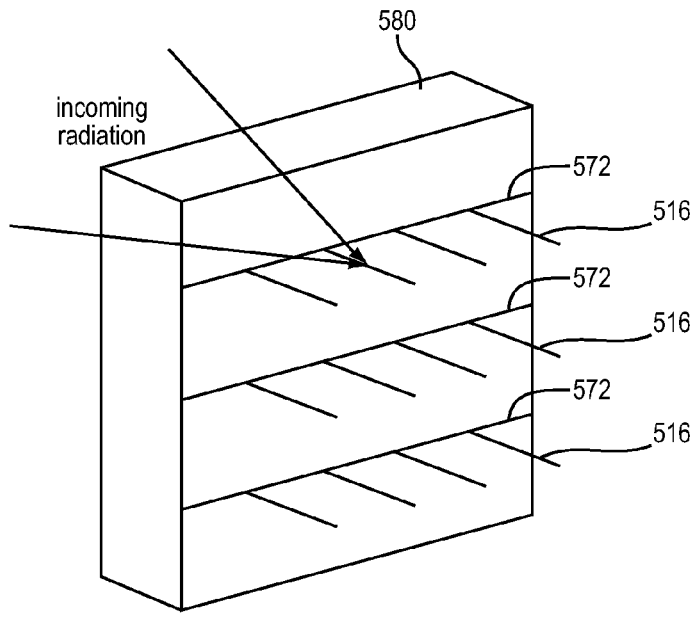
FIG. 5 is a schematic illustrating an EMR detection region having back illumination geometry according to an embodiment of the invention.
Figure 6:
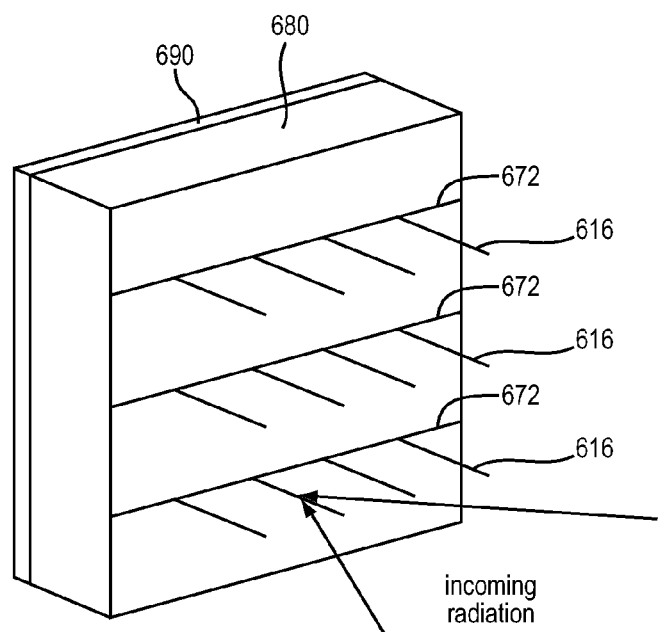
FIG. 6 is a schematic illustrating an EMR detection region having front illumination geometry according to an embodiment of the invention.

FIGS. 5 and 6 respectively illustrate EMR detection regions having back illumination and front illumination geometries, where the EMR detection regions comprise nanoparticle plasmonic detectors.

FIG. 5 illustrates an EMR detection region 512 having back illumination geometry. The nanoparticles 516 are arranged to extend perpendicular to a mounting plane 580 of the detection region 512, or in other words along the axial direction. The mounting plane 580 may be a thin transparent detector mounting plane such that EMR may be transmitted through the mounting plane 580 to impinge upon the nanoparticles 516. Wires 572 are arranged to connect photocurrent from the nanoparticles 516 to signal processing electronics (see FIG. 1).

FIG. 6 illustrates an EMR detection region 612 having a front illumination geometry. Similar to the arrangement in FIG. 5, in FIG. 6, the nanoparticles 616 are arranged to extend perpendicular to a mounting plane 680 of the detection region 612, or in other words along the axial direction. The mounting plane 680 may be arranged very near the focal plane of the detector system. EMR sourced from an infinite distance, and all EMR coming to the focal plane will strike the mounting plane 680. In this case, the mounting plane 680 may be coated with optically black material, ~100% absorbing material, to absorb and not reflect any unused incoming EMR, so that it is not detected as a reflection from the mounting plane 680. Wires 672 are arranged to connect photocurrent from the nanoparticles 616 to signal processing electronics 690. The signal processing electronics 690 may be a backplane processing chip located immediately adjacent to the detector mounting plane 680 to keep stray capacitances and extraneous electrical noise to a minimum.

Performance Estimates—a CAT Example

The distance of the detector region from the focal plane will depend on the object distance of the object desired to be detected by that detector region. This is shown based on the lens equation $1/u+1/v=1/f$, where f is the focal length of the lens, which is the distance from nearest principal plane of the lens to the focal plane, u is the object distance, and v is the image distance from their nearest principal plane in the imaging lens. As u increases, v approaches f, i.e. the image approaches the focal plane. The lens equation may be used to calculate dimensions of each detector system used for detecting CAT at around a 10 km range, as further provided below.

Figure 7:
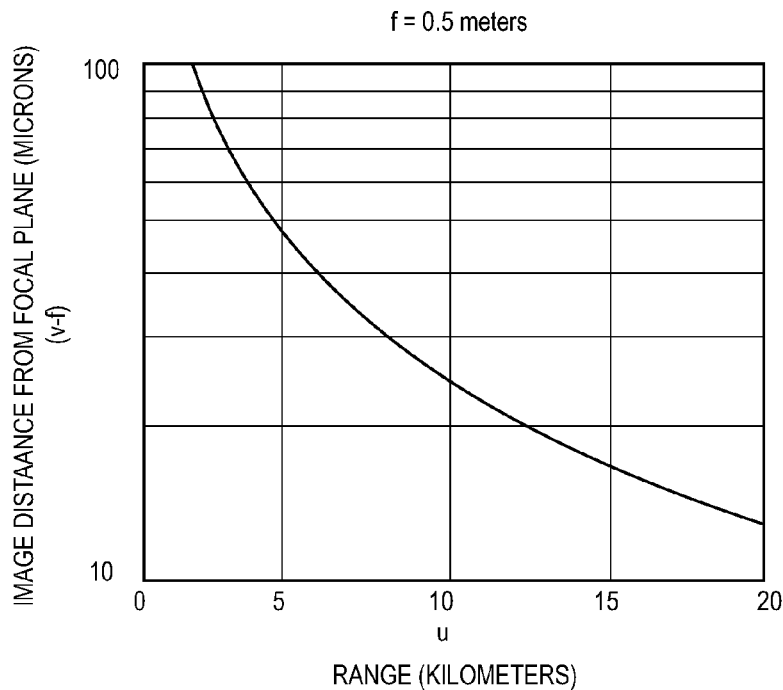
FIG. 7 is a graph illustrating the distance from the focal plane from the detector region as a function of the object distance for a imaging lens focal length of 0.5 meters.
Figure 8:
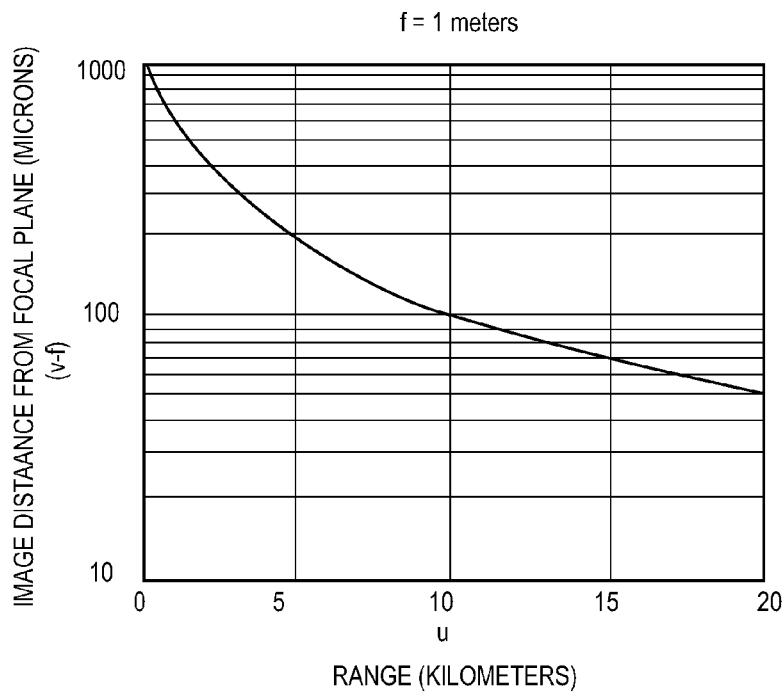
FIG. 8 is a graph illustrating the distance from the focal plane from the detector region as a function of the object distance for an imaging lens focal length of 1.0 meters.

FIGS. 7 and 8 illustrate the distance from the focal plane of the detector region, v–f, as a function of the object distance v, for a thermal imaging lens of focal length 0.5 meters, and 1.0 meters, respectively. As can be seen from FIGS. 7 and 8, an object distance of 10 kilometers, appropriate for CAT detection from an aircraft traveling at about 600 miles/hour, has a distance from the detector region to focal plane of 20 μm and 100 μm, respectively. Thus, the size of the detector regions is constrained by the distance of the object to be detected in ordered to selectively absorb the EMR of interest. The focal length of 1.0 meters, where the detector region for detecting thermal EMR at a distance of 10 km is 100 μm from the focal plane, allows for a larger detection region to detect the 10 km thermal EMR.

It may be preferable to avoid detecting most of the thermal EMR emanating from a range of greater than 20 km. In this case, for the 1.0 meter focal length imaging lens, it would be desirable to include no detector regions at a distance of 50 μm or less from the focal plane.

Atmospheric Turbulence, Image Dancing and Beam Scintillation

Small atmospheric perturbations of ray-angles due to small random temperature fluctuations (scintillation) along the 10 km path-length might still broaden and smear the range subdivisions.

The turbulence of interest is associated with small thermal fluctuations, which along a 10 km path length, may have an appreciable effect on the integrity of the image. In order to estimate the effect of turbulence on the image, information on the thermal fluctuations likely at 10 micron EMR wavelength is needed. The effect of turbulence can be explained with respect to FIGS. 9A, 9B and 10.

Figure 9A:
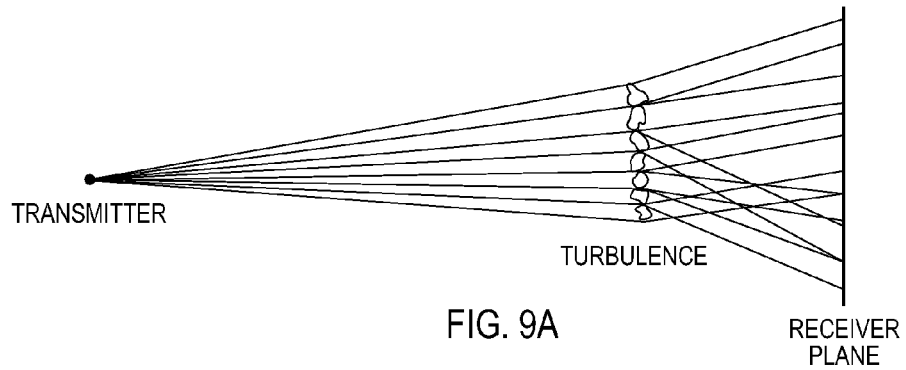
FIGS. 9A and 9B illustrate the effect of turbulence on EMR radiation received from a region of interest and impinging on a receiver plane.
Figure 9B:
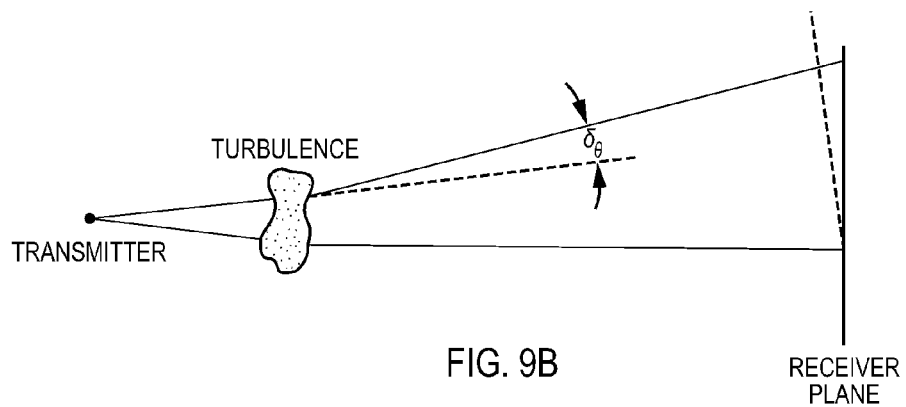

FIGS. 9A and 9B illustrate the effect of turbulence on EMR radiation received from a region of interest located at the point "Transmitter" and impinging on a receiver plane. The turbulence will cause fluctuation in the index of refraction of the air, thus effecting the imaging onto the imaging plane. The effect of atmospheric turbulence depends on the relative sizes of the beam diameter, $d_B$, and the size of the fluctuation, 1. FIG. 9A illustrates the case where the size of the fluctuation 1 is much less than the beam diameter $d_B$ of the radiation from the point "Transmitter," while FIG. 9B illustrates the case where the size of the fluctuation 1 is much greater than the beam diameter $d_B$ of the radiation from the point "Transmitter." As seen in FIGS. 9A and 9B, if $d_B/1 \ll 1$, the major effect of turbulence is to deflect the imaging-beam as a whole. If $d_B/1 \ll 1$, small portions of the beam are diffracted and the imaging beam can become badly distorted.

Figure 10:
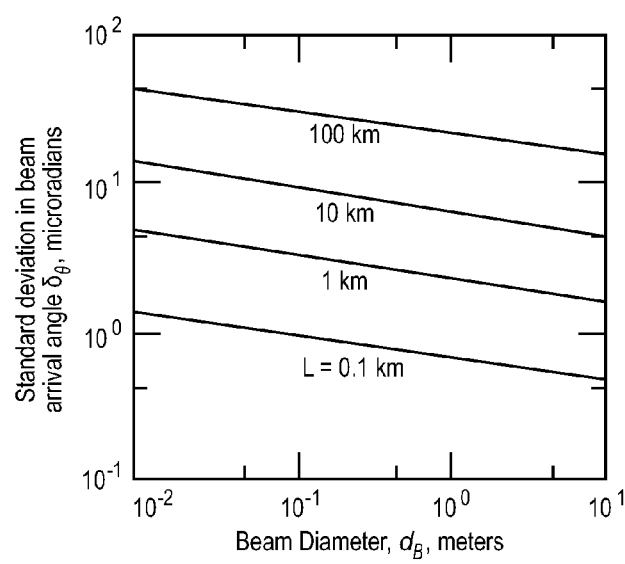
FIG. 10 is graph illustrating standard deviation in arrival angle due to reasonable atmospheric turbulence level as a function of beam diameter $d_B$ for different sizes of index of refraction fluctuation due to turbulence.
Figure 11:
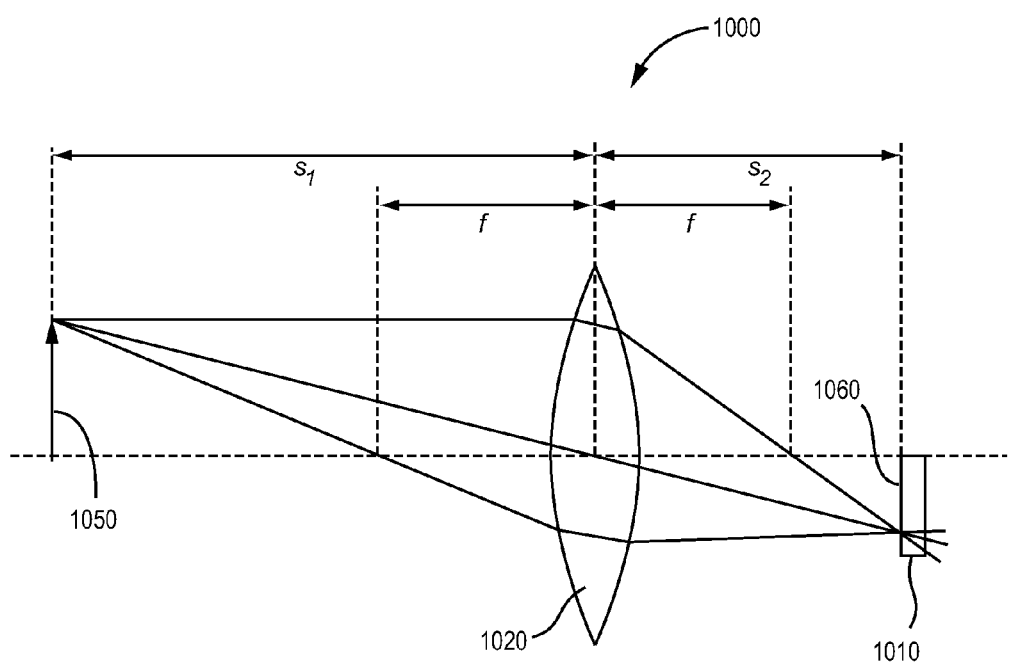
FIG. 11 is a schematic illustrating a conventional imaging system of a camera with a lens as the imaging optics, imaging EMR from an object onto a real image on an FPA.

FIG. 10 illustrates standard deviation in arrival angle due to reasonable atmospheric turbulence level as a function of beam diameter $d_B$ for different sizes of index of refraction fluctuation due to turbulence [see W. K. Pratt, (1969), Laser Communications Systems, Wiley].

The standard deviation in light ray arrival angle due to intermediate atmospheric turbulence is ~10 micro-radians for an object distance of ~10 km for a few cm beam diameter. For a 10 km object distance, 10 micro-radians over a focal length of 1 meter corresponds to a range resolution distance of around 1 micron. In this case, significant image dancing or scintillation blurring of the range resolution is not expected, as the range interval lengths are on the order of ten microns or more.

The described system with axially arranged detector regions allows for sampling of the object space on a reasonably fine spatial scale, which is suitable for detection by an array of microscale axial detectors. The spatial scale of the arrays of the detector regions could be around 1 micron or more, much the same as for a CMOS pixel-array.

For a 1 micron pixel size, 1 m focal length, and a 10 km object range, the magnification is 10,000×, thus providing a spatial sampling at the object plane of around 10 millimeters in principle. A 10 micron pixel will sample the object at 0.1 meter scale, and a 100 micron pixel at the 1 meter scale. All of these spatial scales are acceptable as compared to the characteristic of ~meter plus spatial scales of CAT.

The embodiments of the invention has been described in detail with particular reference to preferred embodiments thereof, but it will be understood by those skilled in the art that variations and modifications can be effected within the spirit and scope of the invention.

What is claimed is:

1. A detector system comprising:
   imaging optics having a focal plane; and
   an electromagnetic radiation (EMR) detector arranged to receive EMR from the imaging optics, having a detector axis perpendicular to the focal plane, and having a plurality of detector regions arranged progressively along the detector axis, the detector regions arranged to respectively detect EMR imaged from progressively different object distances from the imaging optics,
   wherein the EMR detector has a rod shape with the detector axis along an axis of the rod shape,
   wherein the detector regions comprise detector arrays arranged only on a radially outer surface of the rod shape, the EMR detector arranged to receive EMR from the imaging optics impinging only on the radially outer surface of the rod shape from radially outside the rod shape.

2. The detector system of claim 1, wherein the EMR detector has a hole along the axis of the rod shape.

3. The detector system of claim 1, wherein each detector region is configured to selectively detect EMR incident on the detector region at an angle with respect to the detector axis within an angular range, and to selectively discriminate EMR incident outside the angular range, the angular range corresponding to the object distance of the EMR imaged to the detector region, the angular range being progressively different along the detector axis.

4. The detector system of claim 3, wherein each detector region comprises a nanoparticle plasmonic detector having an array of nanoparticles.

5. The detector system of claim 1, wherein each detector region comprises a nanoparticle plasmonic detector having an array of nanoparticles.

6. The detector system of claim 5, wherein the nanoparticles of each detector region have a size, shape and spacing to provide the selective detection of EMR incident on the detector region at an angle with respect to the detector axis within the angular range.

7. The detector system of claim 5, wherein the nanoparticles of each detector region have a size, shape and spacing to selectively detect EMR at a wavelength within a wavelength band.

8. The detector system of claim 7, wherein the wavelength band is within the infrared (IR) region.

9. The detector system of claim 5, wherein the nanoparticles of each detector region have a size, shape and spacing to selectively detect EMR having a predetermined polarization state.

10. The detector system of claim 1, wherein each detector region is configured to detect EMR by a photo-detection process.

11. The detector system of claim 1, wherein each detector region comprises a semiconductor material.

12. The detector system of claim 1, further comprising:
    signal processing electronics configured to receive a detection signal from each of the plurality of detector regions, and to determine the range of an object being imaged by the imaging optics based on the received detection signals.

13. The detector system of claim 12, further comprising: a plurality of wires electrically connecting the signal processing electronics to the plurality of detector regions.

14. The detector system of claim 13, wherein the plurality of wires are transparent or opaque.

15. The detector system of claim 14, wherein the plurality of wires are transparent.

16. The detector system of claim 12, wherein the signal processing electronics comprises a back-plane signal-processing device.

17. The detector system of claim 1, wherein the plurality of detector regions are supported by a transparent supporting substrate.

18. A system for detecting EMR, comprising:
a structure having the detector system of claim 1 mounted thereon, wherein the structure is one of a vehicle or a ground-based platform.

19. An electromagnetic radiation (EMR) detector having a detector axis, comprising:
a plurality of detector regions arranged progressively along the detector axis, the detector regions arranged to respectively detect EMR incident upon respective of the detector regions,
wherein the EMR detector has a rod shape with the detector axis along an axis of the rod shape,
wherein the detector regions comprise detector arrays arranged only on a radially outer surface of the rod shape, the EMR detector arranged to receive EMR from imaging optics impinging only on the radially outer surface of the rod shape from radially outside the rod shape.

20. The EMR detector of claim 19, wherein the EMR detector has a hole along the axis of the rod shape.

21. The EMR detector of claim 19, wherein each detector region is configured to selectively detect EMR incident on the detector region at an angle with respect to the detector axis within an angular range, and to selectively discriminate EMR incident outside the angular range, the angular range being progressively different along the detector axis.

22. The EMR detector of claim 19, wherein each detector region comprises a nanoparticle plasmonic detector having an array of nanoparticles.

23. The EMR detector of claim 22, wherein the nanoparticles of each detector region have a size, shape and spacing to provide the selective detection of EMR incident on the detector region at an angle with respect to the detector axis within the angular range.

* * * * *